United States Patent [19]
Roland

[11] Patent Number: 6,011,334
[45] Date of Patent: Jan. 4, 2000

[54] IN-LINE FLUID-DRIVEN ELECTRIC POWER GENERATOR

[75] Inventor: Louis Roland, La Celle Saint Cloud, France

[73] Assignee: Elf Aquitaine Production, Courbevoie, France

[21] Appl. No.: 08/808,162

[22] Filed: Feb. 28, 1997

[30] Foreign Application Priority Data

Feb. 28, 1996 [FR] France .................. 96 02495

[51] Int. Cl.[7] .................. H02K 7/10; H02K 16/02; F04B 35/04
[52] U.S. Cl. .................. 310/86; 310/103; 310/114; 310/104; 290/43; 290/54
[58] Field of Search .................. 310/86, 103, 104, 310/114, 266; 290/43, 52, 54

[56] References Cited

U.S. PATENT DOCUMENTS

| | | | |
|---|---|---|---|
| 2,436,683 | 2/1948 | Wood, Jr. ................ | 290/52 |
| 4,277,707 | 7/1981 | Silver et al. ............... | 310/104 |
| 4,367,413 | 1/1983 | Nair ........................ | 290/52 |
| 4,982,128 | 1/1991 | McDonald ................. | 310/156 |
| 5,043,592 | 8/1991 | Hochstrasser .............. | 290/52 |
| 5,209,650 | 5/1993 | Lemieux ................... | 417/356 |

FOREIGN PATENT DOCUMENTS 1384847  11/1963  France ................... 310/104

*Primary Examiner*—Nestor Ramirez
*Assistant Examiner*—Karl Tamai
*Attorney, Agent, or Firm*—Oblon, Spivak, McClelland, Maier & Neustadt, P.C.

[57] ABSTRACT

An electric power generator driven by a fluid circulating under pressure in a pipe (9) includes an internal moving contact (1) placed inside a non-magnetic section (10) of the pipe (9), and a stator (4) placed around the pipe (9). The internal moving contact (1) includes permanent magnets (2), a rotational drive means (3), and means (7 and 8) of support. The electric power generator does not require any sealed joints for the passage of mechanical shafts or electric cables and is particularly adapted for the production of electricity from dangerous fluids which circulate in pipes under high pressure. The electric power generator has application in gas and liquid transport networks, particularly at isolated hydrocarbon production sites.

2 Claims, 4 Drawing Sheets

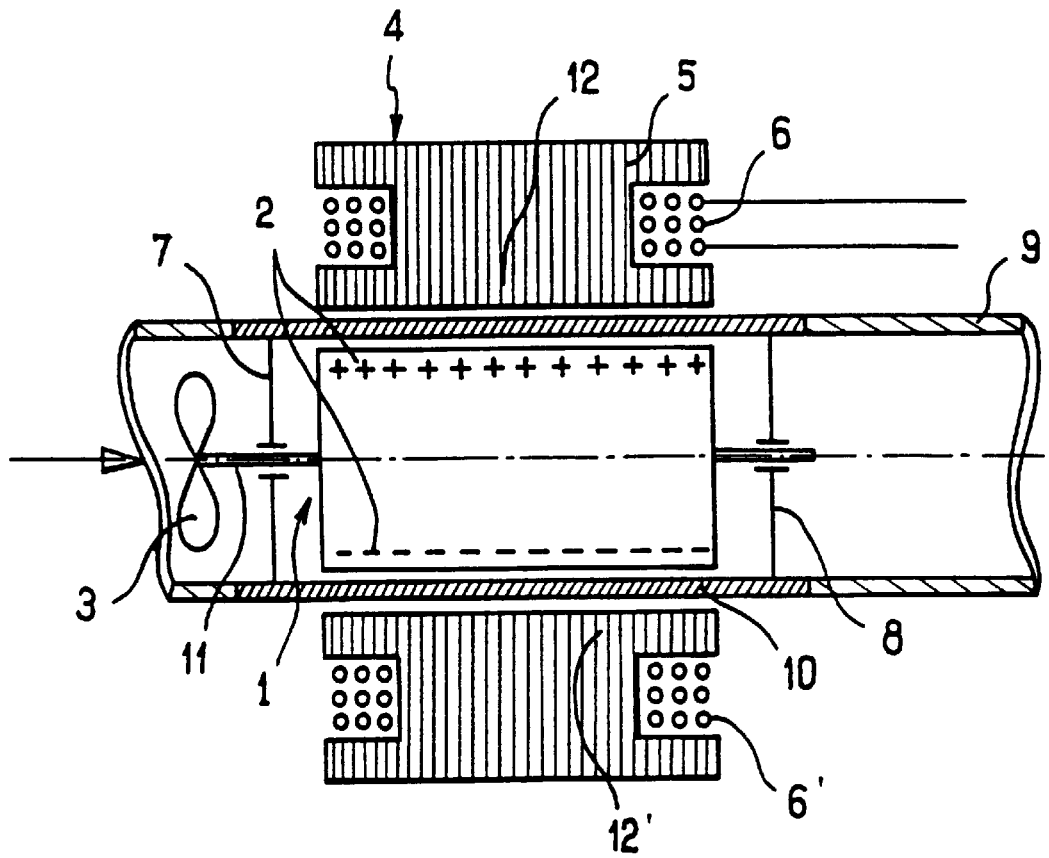
FIG_1a
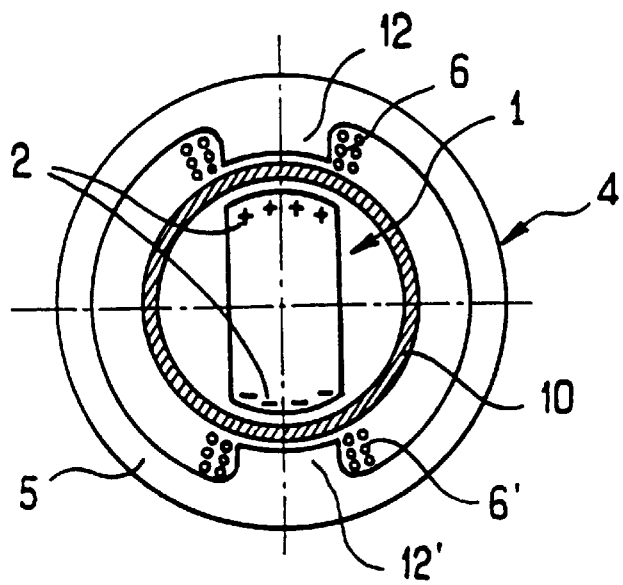
FIG_1b

IN-LINE FLUID-DRIVEN ELECTRIC POWER GENERATOR

CROSS REFERENCES TO RELATED APPLICATIONS

This application claims priority to French Patent Application 96 02495 filed Feb. 28, 1996, which is incorporated herein by reference.

BACKGROUND OF THE INVENTION

1. Field of the Invention

The present invention relates to an electric power generator in an independent line which operates off mechanical energy picked up from a fluid which circulates in a pipe. The present invention has applications in gas and/or fluid transport and distribution networks by means of pipelines, in ocean platforms, in underwater sites, and in hydrocarbon production sites, in agricultural applications, and in general, in all sites where electricity is needed and where mechanical energy in the form of a fluid under pressure is available.

2. Discussion of Background

At many agricultural or industrial sites, mechanical energy is available in the form of liquid or gas fluid which circulates in a pipeline. At these sites, electricity is needed to provide power to equipment used for remote measurement, remote control, telecommunications, or air conditioning, etc. The local production of electric power is particularly advantageous at isolated sites in order to avoid laying electric cables to deliver electric power which could be expensive or technically unfeasible.

The invention described in French patent 2,686,376 provides for the conversion of mechanical energy of a moving fluid into electricity using a turbo-alternator driven by a gas, liquid, or gas/liquid mixture which circulates in a pipeline. The turbo-alternator is made up of a one-piece assembly that includes an angular turbine whose wheel is one piece in rotation of the alternator rotor. It also includes bearings in an airtight and equipressure mechanical joint which keeps motor fluid separate from oil used for bathing the rotor. The rotor of the alternator is placed outside the pipeline and is embedded in a circuit cooled by oil under pressure. The motor fluid input and output shafts are perpendicular, making the installation of the generator in a straight section of the pipeline impossible.

The above-described generator, in order to be usable with a fluid under high pressure, must include a body with very thick walls in order to resist the pressure. This results in a very heavy and very expensive assembly unit and in some applications such as oil production at sea, the weight of the equipment is a determining factor since expensive infrastructures may be needed to support the equipment. For this reason, a delicate vertical support is needed as a source to prevent vibration and wearing of the bearings and of the sealed mechanical joint. Consequently, monitoring is required with frequent maintenance and/or short operating lifetime making the generator quite costly to operate and build.

The above-described generator also includes feedthroughs for cables and an external oil cooling circuit. This complicates the installation and creates the risk of fluid leakage under pressure. For some applications in which the fluid is dangerous because of its toxicity and/or its flammability, this above-described generator does not offer sufficient safety guarantees.

SUMMARY OF THE INVENTION

Accordingly, one object of the present invention is to provide a novel in-line fluid-driven electric generator that operates off the mechanical energy taken from a fluid circulating in a pipeline.

Another object of the present invention is to provide a novel electric generator which can be installed on a straight section of a pipeline without any modification of the pipeline's longitudinal and/or cylindrical shape.

Another object of the present invention is to provide a novel electric generator which can operate with liquid or gas fluids or with liquid/gas mixtures that may contain solid particles, as is the case of fluids encountered in the production of hydrocarbons.

Another object of the present invention is to provide a novel electric generator which does not require a lubricating and cooling circuit having oil under pressure.

Another object of the present invention is to provide a novel electric generator which does not include any sealed mechanical joint for pressure equilibrium or sealed feedthrough for electric wires, allowing for the electric generator to be safely used with dangerous fluids at high pressure.

Another object of the present invention is to provide a novel electric generator with low weight as compared to conventional systems, thereby reducing or eliminating a requirement of specific support means and reducing or eliminating vibrations.

Another object of the present invention is to provide a novel electric generator that is a rugged, that requires neither monitoring nor maintenance, that offers a long operating lifetime without intervention (i.e., several years required in the case of submarine applications), that offers ease of transport and handling, and that can be installed in vertical or horizontal position.

Another object of the present invention is to provide a novel electric generator assembly unit which is economical to manufacture and operate and which can be used bidirectionally.

The above and other objects are achieved according to the present invention by providing a new and improved electric power generator including an internal moving contact (also referred to as an "internal rotor") placed inside a non-magnetic section of a pipe, and a stator placed around the pipe. The internal moving contact includes permanent magnets, a rotational drive means, and means of support. The electric power generator does not require any sealed joints for the passage of mechanical shafts or electric cables and is particularly adapted for the production of electricity from dangerous fluids which circulate in pipes under high pressure. The electric power generator has application in gas and liquid transport networks, particularly at isolated hydrocarbon production sites.

According to an aspect of the present inventions the electric generator of the invention also includes an external moving contact (also referred to as an "external rotor") of hollow cylindrical form that is placed between the pipe and the stator. The external moving contact is made of ferromagnetic material, provided with at least one permanent magnet on its outer periphery, and positioned longitudinally with respect to the stator. The external moving contact also includes at least one permanent magnet on its inner periphery positioned longitudinally with respect to the permanent magnet of the internal moving contact so that the external moving contact can be driven magnetically in rotation by the internal moving contact.

According to another aspect of the present invention, the stator is offset longitudinally with respect to the permanent magnet of the internal moving contact. The electric generator additionally includes an external moving contact placed between the pipe and the stator. The external moving contact is made at least partially of a ferromagnetic material, is provided with at least one permanent magnet on its outer periphery, and is positioned longitudinally with respect to the stator. The external moving contact also includes at least one permanent magnet on its inner periphery positioned longitudinally with respect to the permanent magnet of the internal moving contact so that the external moving contact will be driven magnetically in rotation by the internal moving contact.

According a further aspect of the present invention, the rotational drive means of the internal moving contact includes a turbine and a means of mechanical coupling for coupling the turbine to the internal moving contact.

According to an additional aspect of the present invention, the generator further includes annular sealed joints that are placed around the ends of the internal moving contact to prevent the fluid from circulating in a space between an external wall of the internal moving contact and an internal wall of the pipe in which the fluid circulates. The internal moving contact includes longitudinal cavities for the passage of the fluid.

According to yet another aspect of the present invention, the internal moving contact is a cylinder which includes spiral blades on its periphery.

According to a still further aspect of the present invention, the internal moving contact is a hollow cylinder which includes spiral blades on its internal wall which constitute the rotational drive means of the internal moving contact.

According to a yet further aspect of the present invention, annular sealed joints are placed around the ends of the internal moving contact to prevent the fluid from circulating in a space between an external wall of the cylindrical hollow internal moving contact and an internal wall of the pipe in which the fluid is circulating.

According to a still further aspect of the present invention, the electric generator further includes blades and magnetic or ceramic thrust collars which support the internal and/or external moving contacts.

The low weight of the electric generator of the present invention, as compared to conventional generators, results from installation of the stator outside the sealed pipe in which the fluid under pressure is circulating. Thus, since only the rotor of the generator is installed inside the pipes only the rotor of the generator is subjected to fluid pressure. Accordingly, a housing and outlet boxes for cables which must resist the fluid pressure, and which are heavy in order to enclose the stator are not required as compared to conventional generators. The electric generator of the present invention advantageously can be installed downstream of filtration and steadying devices of a fluid stream.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein:

FIGS. 1a and 1b are longitudinal and transverse sectional views, respectively, of an electric power generator having an induction coil placed outside a pipe having fluid under pressure, according to a first embodiment of the present invention;

DESCRIPTION OF THE PREFERRED EMBODIMENTS

Figure 2A:
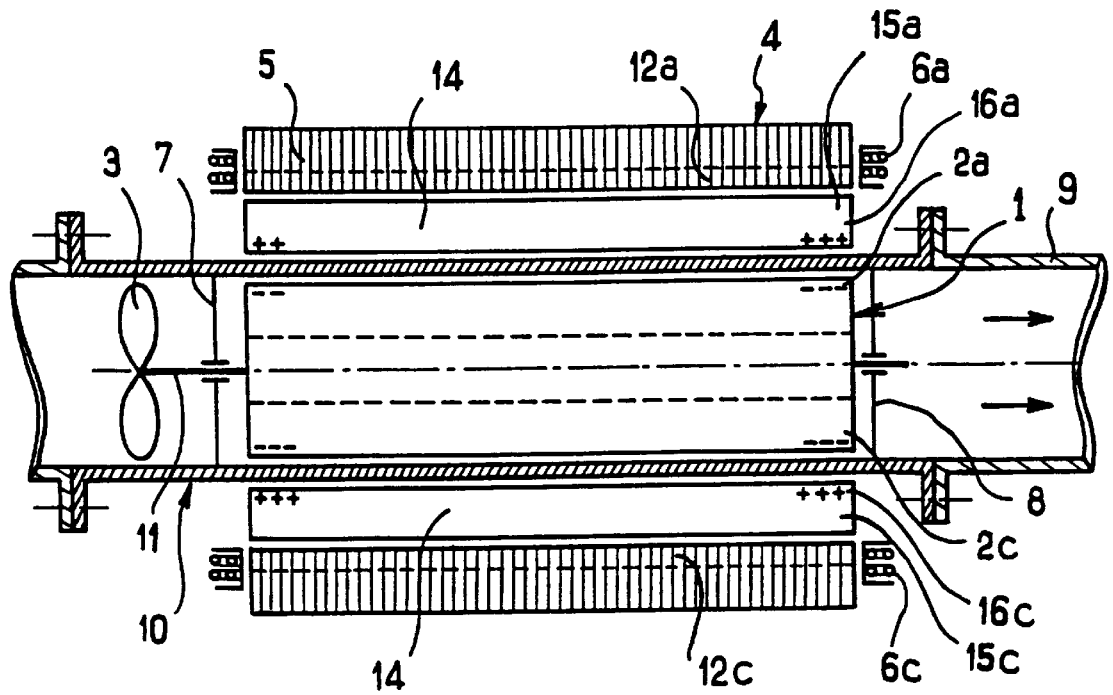
FIGS. 2a and 2b are longitudinal and transverse sectional views, respectively, of an electric power generator having a rotor and a stator placed outside a pipe having fluid under pressure, with the rotor being driven magnetically by a moving contact placed in the pipe, according to a second embodiment of the present invention.

Referring now to the drawings, wherein like reference numerals designate identical or corresponding parts throughout the several views, and more particularly to FIGS. 1a and 1b thereof, there is illustrated electric power generator according to a first embodiment of the present invention including an internal moving contact 1 (also referred to as an "internal rotor") and a stator 4. The internal moving contact 1 includes a permanent magnet 2, a shaft 11, a turbine 3, and bearing 7 and 8. The stator 4 includes a magnetic circuit 5 provided with two polar parts 12 and 12', and two induction coils 6 and 6'.

The moving contact 1, supported by the bearings 7 and 8, is installed inside pipe 9, and is mechanically coupled to the turbine 3 by shaft 11. The stator 4 of the generator is installed outside the pipe 9 and is positioned longitudinally with respect to the permanent magnet 2.

The section 10 of the pipe 9 on which the stator 4 and the moving contact 1 are installed is made, for example, from a non-magnetic material such as titanium. The thickness of the section 10 of the pipe 9 is calculated so that it will resist the internal pressure of the fluid in pipe 9. The bearings 7 and 8 function to support the radial and axial, static, dynamic, and thermal effects to which the internal moving contact is subjected.

The stator 4 is supported by suitable mechanical means (not shown) for the purpose of holding the stator 4 in a fixed position with respect to the pipe 9. The fluid circulating in the pipe 9 acts on the turbine 3 to create a rotational movement of the moving contact 1 and supports the permanent magnet 2.

The electric power generator according to a first embodiment of the present invention produces electric power from the kinetic energy of a fluid circulating under pressure in the pipe 9 . The fluid acts on the electric power generator as it circulates in the pipe 9. As the fluid causes the permanent magnet 2 to pass in front of the polar pieces 12 and 12', the magnetic circuit 5 produces a variable magnetic field which produces an electric voltage in the induction coil 6 and 6'.

Figure 2B:
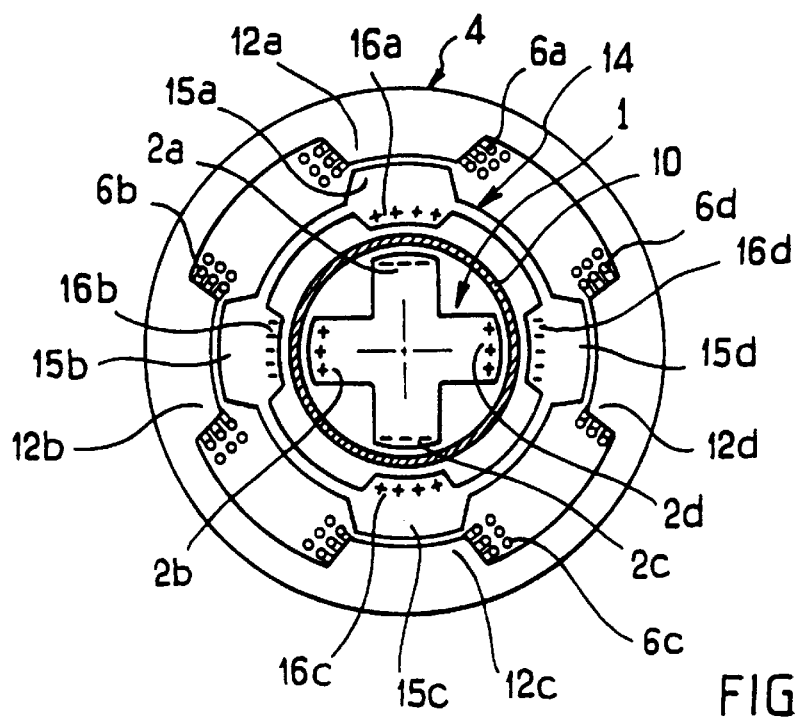

FIGS. 2a and 2b illustrate an electric power generator according to a second embodiment of the present invention including an internal moving contact 1, a stator 4, and an external moving contact 14 (also referred to as an "external rotor"). The external moving contact 14 includes four external permanent magnets 15a, 15b, 15c and 15d, and four internal permanent magnets 16a, 16b, 16c and 16d. The internal moving contact 1 includes four magnets 2a, 2b, 2c and 2d, a turbine 3, a shaft 11, and bearings 7 and 8. The stator 4 includes a magnetic circuit 5 having four polar parts 12a, 12b, 12c and 12d and four induction coils 6a, 6b, 6c and 6d.

The external moving contact 14 is supported by suitable means (not shown) and is installed outside pipe 9. The internal moving contact 1 is supported by the bearings 7 and 8, is installed inside a section 10 of the pipe 9 which is made of a non-magnetic material, and is mechanically coupled to the turbine 3. The stator 4 of the generator is installed outside the pipe 9 and positioned longitudinally with respect to the magnets 15a, 15b, 15c, 15d, 16a, 16b, 16c and 16d of the external moving contact 14 and with respect to the magnets 2a, 2b, 2c and 2d of the internal moving contact 1.

The internal moving contact 1 is driven mechanically by the turbine 3 on which the fluid circulating in pipe 9 acts. The contact 1 drives, via magnetic coupling, the external moving contact 14 by virtue of the interaction between the four magnets 2a, 2b, 2c and 2d and the four magnets 16a, 16b, 16c and 16d respectively. The magnets 15a, 15b, 15c and 15d which are located on an outer periphery of the external moving contact 14, pass successively in front of the polar parts 12a, 12b, 12c and 12d of the permanent magnetic circuit 5 of the stator 4 creating a variable magnetic fluxes through the induction coils 6a, 6b, 6c and 6d, producing electric voltages in coils 6a, 6b, 6c and 6d.

Figure 3:
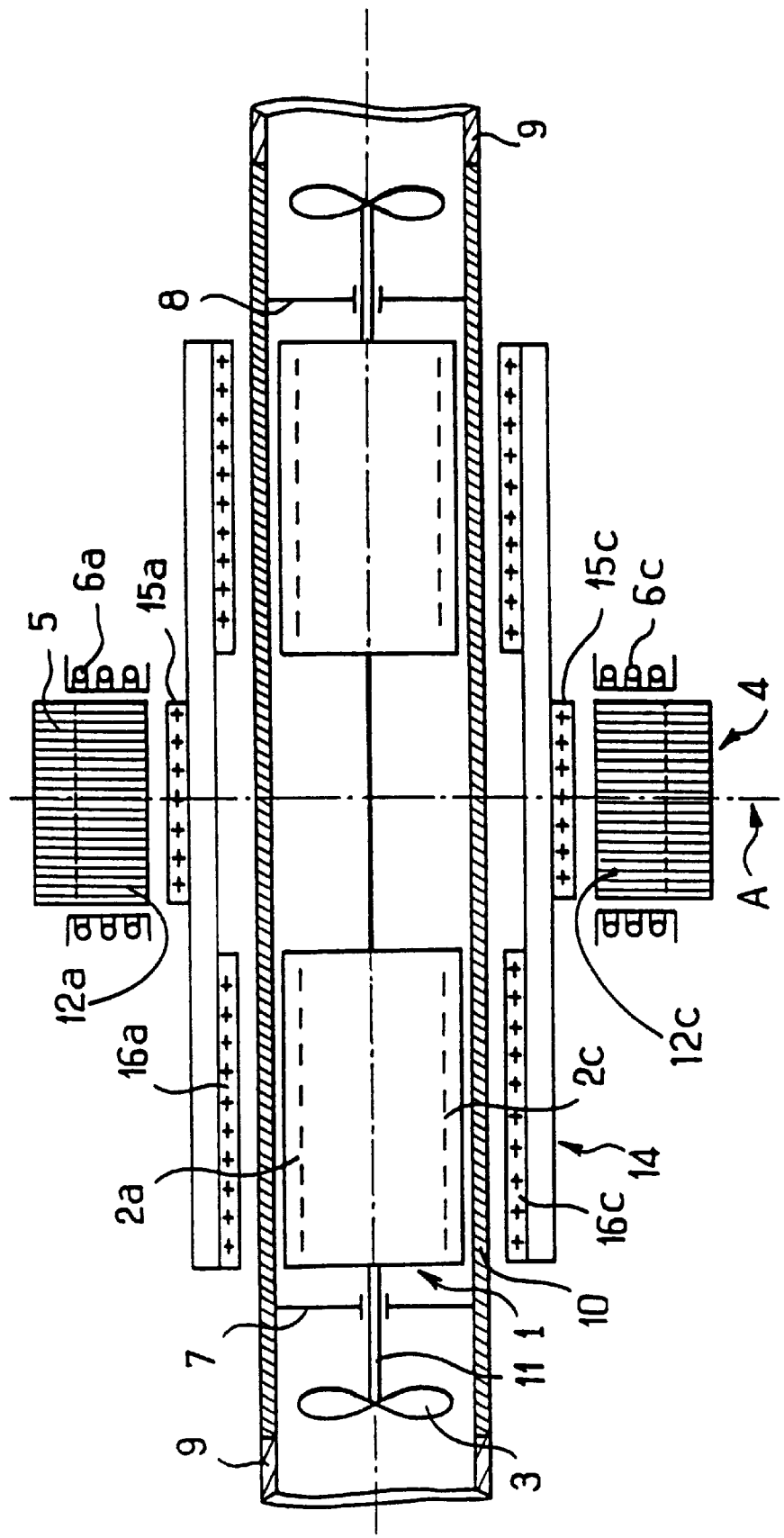
FIG. 3 is a longitudinal view of an electric power generator having a rotor and a stator offset longitudinally, according to a third embodiment of the present invention.

FIG. 3 illustrates an electric power generator according to a third embodiment of the present invention including the same components as the electric power generator of the second embodiment, but arranged differently as will now be explained. The magnets 16a, 16b, 16c and 16d of the external moving contact 14 are positioned longitudinally with respect to the magnets 2a, 2b, 2c and 2d of the internal moving contact 1. The magnets 15a, 15b, 15c and 15d, located on an outer periphery of the external moving contact 14, are offset longitudinally with respect to the magnets 16a, 16b, 16c and 16d as well as the polar parts 12a, 12b, 12c and 12d of the stator 4.

In order to improve mechanical equilibrium of the internal and external moving contacts 1 and 14, the internal and external moving contacts 1 and 14 will preferably be made in two parts, each part being arranged symmetrically with respect to the plane A of symmetry of the stator 4 which is perpendicular to the axis of the pipe 9. By virtue of this arrangement, mechanical vibrations of the two moving contacts 1 and 14 are reduced.

Figure 4:
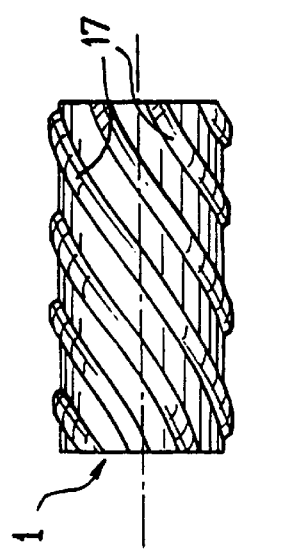
FIG. 4 is a longitudinal view of an internal moving contact of an electric power generator which includes spiral blades on its periphery, according to a fourth embodiment of the present invention.

FIG. 4 illustrates an electric power generator according to a fourth embodiment of the present invention including an internal moving contact 1 which is a solid cylinder provided with spiral blades 17. The action of the fluid circulating in the pipe 9 acts on the blades 17 to cause the internal moving contact 1 to rotate.

Figure 5:
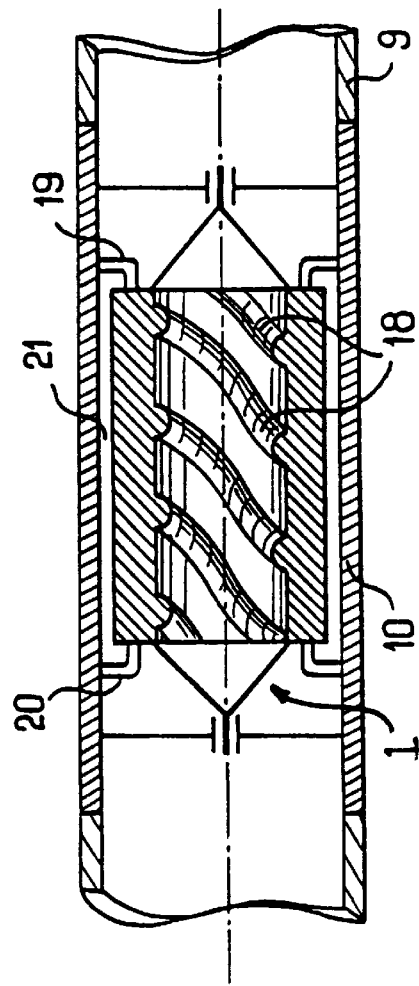
FIG. 5 is a longitudinal view of an internal moving contact of an electric power generator in the form of a hollow cylinder that includes spiral blades and sealed joints at its ends, according to a fifth embodiment of the present invention.

FIG. 5 illustrates an electric power generator according to a fifth embodiment of the present invention including an internal moving contact 1 which is a hollow cylinder whose internal wall is provided with spiral blades 18. The action of the fluid circulating in the pipe 9 passes through the hollow part of the internal moving contact 1 and acts on the spiral blades 18 to cause the internal moving contact 1 to rotate.

In FIG. 5, annular joints 19 and 20 prevent solid particles that are contained in the fluid circulating in pipe 9 from passing into the space 21 between the external wall of the internal moving contact 1 and the internal wall of the section 10 of pipe 9. The above structure will prevent the solid particles that are contained in the fluid circulating in pipe 9 from blocking the moving contact 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electric power generator, comprising:

an internal moving contact inside a non-magnetic section of a pipe in which a fluid circulates, including,
at least one permanent magnet,
a mechanical drive power element coupled to the permanent magnet and acted upon by the circulating fluid to produce a rotation of the permanent magnet in response to circulation of the fluid,
and at least one bearing supporting said permanent magnet and the mechanical drive power element in the pipe; and
a stator placed around the section of the pipe, including,
a permanent magnetic circuit having at least one induction coil, wherein the stator is offset longitudinally with respect to the permanent magnet of the internal moving contact, comprising:

an external moving contact placed between the pipe and the stator, at least made partially of a ferromagnetic material, and positioned longitudinally with respect to the stator, including,
at least one external permanent magnet on an outer periphery of the external moving contact, and
at least one internal permanent magnet on an inner periphery of the external moving contact and positioned longitudinally with respect to the permanent magnet of the internal moving contact, wherein the external moving contact is driven magnetically in rotation by the internal moving contact.

2. The generator according to claim 1, wherein the mechanical drive power element of the internal moving contact includes a turbine coupled to the internal moving contact.

* * * * *